United States Patent [19]

Vyse

[11] Patent Number: 4,804,212
[45] Date of Patent: Feb. 14, 1989

[54] CRIMPED HOSE FITTING
[75] Inventor: Gerrard N. Vyse, Bedford, Tex.
[73] Assignee: Stratoflex, Inc., Fort Worth, Tex.
[21] Appl. No.: 205,537
[22] Filed: Jun. 10, 1988

Related U.S. Application Data

[63] Continuation of Ser. No. 927,677, Nov. 6, 1986, abandoned.

[51] Int. Cl.$^4$ .............................................. F16L 33/20
[52] U.S. Cl. ..................................... 285/256; 285/259; 29/508; 29/237
[58] Field of Search ..................... 285/256, 259, 382.2, 285/382.1

[56] References Cited

U.S. PATENT DOCUMENTS

| 2,214,001 | 3/1943 | Lusher et al. . | |
| 2,300,517 | 11/1942 | Milton | 285/256 X |
| 2,432,598 | 12/1947 | Weatherhead, Jr. . | |
| 2,453,997 | 11/1948 | MacWilliam | 285/256 |
| 2,489,890 | 11/1949 | Hufferd . | |
| 2,496,037 | 1/1950 | Courtot . | |
| 2,517,669 | 8/1950 | Hufferd et al. | 285/256 |
| 2,570,477 | 10/1951 | Paquin . | |
| 2,584,948 | 2/1952 | Weatherhead, Jr. . | |
| 2,795,041 | 6/1957 | Klinksiek et al. . | |
| 3,165,338 | 1/1965 | Moss | 285/256 |
| 3,345,091 | 10/1967 | Nicol | 285/256 |
| 3,512,810 | 5/1970 | Harris | 285/256 |
| 3,549,180 | 12/1970 | MacWilliam | 285/256 |
| 4,106,526 | 8/1978 | Szentmihaly | 285/259 X |
| 4,330,142 | 5/1982 | Paini . | |
| 4,366,841 | 1/1983 | Currie et al. . | |
| 4,544,187 | 10/1985 | Smith | 285/256 |
| 4,548,430 | 10/1985 | Haubert et al. | 285/256 |
| 4,611,832 | 9/1986 | Matsuoka et al. | 285/256 X |
| 4,653,779 | 3/1987 | Foster | 285/256 |

FOREIGN PATENT DOCUMENTS 2305466  8/1974  Fed. Rep. of Germany ...... 285/256

Primary Examiner—Thomas F. Callaghan
Attorney, Agent, or Firm—Marshall, O'Toole, Gerstein, Murray & Bicknell

[57] ABSTRACT

This disclosure relates to apparatus and method for forming a hose and fitting assembly. The fitting comprises a nipple and a socket. One end of the nipple is inserted into the end of a length of hose and the other end of the nipple is attachable to another part such as a swivel connector. The socket is mounted around the nipple and the end of the hose, and the socket is crimped. A first part of the socket is crimped into engagement with the hose, a second part is crimped into direct engagement with the nipple, and a third part of the socket is crimped to form wrench flats. The apparatus for assembling the hose and fitting comprises a die set and a mechanism for forcing the dies of the set against the socket. Each die comprises first, second and third parts which respectively engage and crimp the first, second and third parts of the socket.

4 Claims, 1 Drawing Sheet

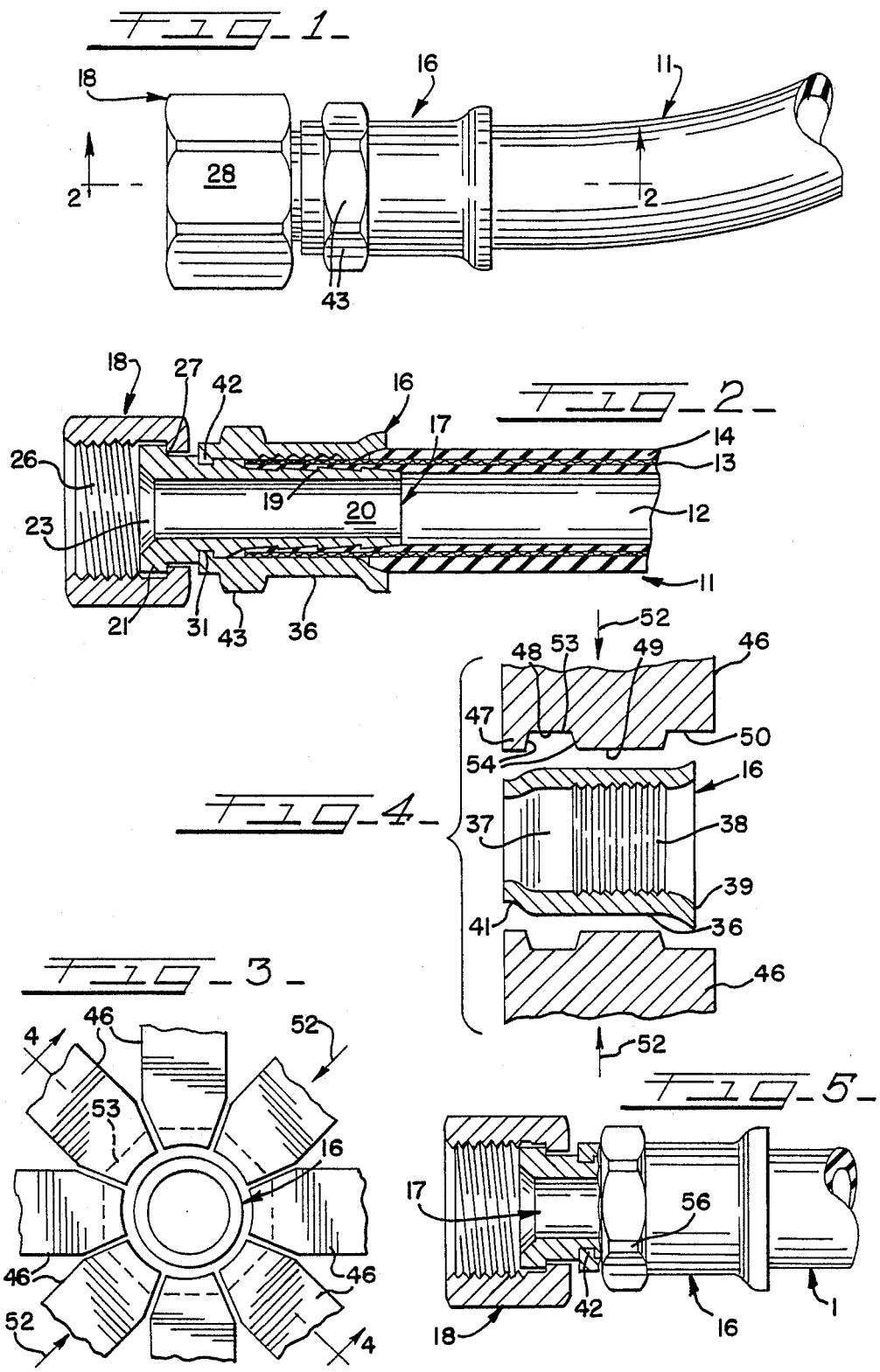

CRIMPED HOSE FITTING

This application is a continuation of application Ser. No. 927,677, filed Nov. 6, 1986, and now abandoned.

FIELD AND BACKGROUND OF THE INVENTION

This invention relates to a hose and fitting assembly, and more particularly to a relatively inexpensive crimped fitting assembly and method of assembly.

Hose fittings are well known and have been in common use for many years. Such a fitting is secured to an end of a length of hose in order to form an assembly which is used to convey a liquid or gas. Such fittings are extensively used and there has been a continuous effort on the part of manufacturers and designers to simplify the construction in order to reduce costs.

A common type of hose fitting includes a socket, a nipple and a swivel nut. The nipple is inserted into an end of the hose and the swivel nut is rotatably connected to the nipple and serves to attach the fitting to another part. Since the nut is normally screwed and tightened on the other part, the socket and the nipple should be held against rotation when the swivel nut is turned, to prevent the hose from being twisted. To this end, it is common practice to form wrench flats either on the socket or on the nipple so that the socket and nipple may be held by a wrench. Such wrench flats may be machined or the socket (or nipple) may be formed from octagonal or hexagonal stock which is machined so as to leave a portion unmachined which forms the wrench flats. Machining is, however, a relatively expensive operation and adds substantially to the cost of a fitting.

It is a general object of the present invention to simplify the construction and reduce the cost of a crimped-type hose and fitting assembly.

SUMMARY OF THE INVENTION

Apparatus and method in accordance with the invention relates to a hose and fitting assembly, the fitting comprising a nipple and a socket. One end of the nipple is inserted into the end of a length of hose and the other end of the nipple is attachable to another part such as a swivel connector. The socket is mounted around the nipple and the end of the hose, and the socket is crimped. A first part of the socket is crimped into engagement with the hose, a second part is crimped into direct engagement with the nipple, and a third part of the socket is crimped to form wrench flats.

The apparatus for assembling the hose and fitting comprises a die set and means for forcing the dies of the set against the socket. Each die comprises first, second and third parts which respectively engage and crimp the first, second and third parts of the socket.

BRIEF DESCRIPTION OF THE DRAWINGS

The invention will be better understood from the following detailed description taken in conjunction with the accompanying figures of the drawings wherein:

FIG. 1 is an elevational view showing a hose and fitting assembly in accordance with the present invention;

FIG. 2 is a sectional view taken on the line 2—2 of FIG. 1;

FIG. 3 is a fragmentary sectional view showing a socket of the fitting and dies before crimping;

FIG. 4 is a sectional view taken on the line 4—4 of FIG. 3; and

FIG. 5 is a view with some parts in section showing the crimped assembly.

DETAILED DESCRIPTION OF THE DRAWINGS

FIGS. 1 and 2 of the drawings show a fitting 10 secured to an end portion of a length of hose 11. In the specific example illustrated herein, the hose 11 is of the type including an inner tube 12, a layer 13 of reinforcement which surrounds the tube 12, and an outer cover 14, the tube 12 and the cover 14 being made of a flexible and resilient material such as synthetic rubber. In the specific example illustrated, a portion of the outer cover 14 is cut away, or skived, to bare the outer side of the reinforcement, so that a socket of the fitting may make direct engagement with the reinforcement.

The fitting 10 includes an outer socket 16, a nipple 17 and a swivel nut 18. The nipple 17 includes an insert portion 20 which extends into the interior of the inner tube 12 of the hose, and the outer surface of the insert portion 20 may include annular barbs 19 as illustrated in FIG. 2. To the left (as seen in FIG. 2) of the insert portion 20 of the nipple, the left-hand end of the nipple has an attachment portion including a radially outwardly extending flange 21 which interconnects with the swivel nut 18. An interior bore of the nipple and the nut forms a fluid passageway through the fitting, and the left-hand end of the nipple 20 forms an interior flare 23 for use in making a sealed connection with another part (not illustrated).

The swivel nut 18 is a tubular member having an interior thread 26 formed on its lefthand portion. The right-hand end of the swivel nut 18 has a radially inwardly extending flange 27 which interlocks with the flange 21 of the nipple 17. The swivel nut 18 is assembled with the nipple 17 prior to the connection of the nipple 17 with the hose 11 and the socket 16. As will be apparent from FIG. 2, the maximum diameter of the nipple 17 to the right of the flange 21 is less than the internal diameter of the flange 27 of the swivel nut 18, so that the swivel nut 18 may be slipped over the nipple from the right-hand end of the nipple and moved up to the flange 21 of the nipple 17. As shown in FIG. 1, the exterior surface of the swivel nut 18 has wrench flats 28 formed on it, the flats being hexagonal in this example.

The attachment portion of the nipple 17 further includes an annular radially inwardly extending groove 31, which is provided for the connection of the nipple 17 with the socket 16 as will be described. FIGS. 1, 2 and 5 show the configuration of the socket 16 after crimping, and FIGS. 3 and 4 show the socket 16 before crimping.

With reference next to FIG. 4, the tubular socket 16 comprises, before crimping, a substantially cylindrical center portion 36. The interior of the portion 36 is preferably provided with a plurality of annular ribs 38 to enhance the connection of the socket with the reinforcement of the hose 11. The right-hand end (as seen in FIG. 4) is preferably flared radially outwardly slightly as indicated by the numeral 39 to prevent the socket 16 from cutting into the outer cover 14 of the hose if the hose is bent relative to the fitting. The left-hand end of the socket 16 is curved radially inwardly slightly as indicated by the numeral 41. A portion 37 of the socket having smooth inner and outer surfaces is formed between the ribs 38 and the inwardly flared portion 41. The preferred method of making the socket is to cold form a piece of metal to form a blank and then to form the ribs 38 and the flare 41 by a machining operation. In another method, the socket may be formed from a piece of straight tubular stock which is rolled to form the flares 39 and 41 and the ribs 38.

With specific reference to FIG. 2, when the socket 16 is in its crimped form on the hose 11 and the nipple 17, the inwardly flared portion 41 forms a radially extending flange 42 which extends tightly into the annular groove 31 of the nipple 17, thereby firmly anchoring the socket 16 to the nipple 17. The central portion 36 of the socket which includes the ribs 38 is deformed radially inwardly into tight engagement with the reinforcement 13 of the hose. The end portion of the hose 11 is tightly compressed between the nipple and the socket, the annular barbs 19 of the nipple and the ribs 38 of the socket 16 grip the hose, and a seal is formed between the nipple and the inner tube 12. The portion 37 of the socket 16 between the central portion 36 and the flange 41 is deformed into the shape of octagonal wrench flats 43 which are engageable by a wrench (not shown) in order to hold the socket 16 and the hose 11 against turning while the swivel nut 18 is being tightened onto another part (also not shown).

The socket 16 is swaged as described above by a set of dies 46 (FIGS. 3 and 4), there being eight (in the present specific example) identical dies 46, and FIG. 4 illustrates in cross section the shape or configuration of the faces of the dies 46. Each die includes a radially inwardly extending portion 47 which engages the flare 41 of the socket and deforms it inwardly to form the flange 42 which is pressed into the annular groove 31. Each die further includes a recess 48 which overlies the portion 37 of the socket and has the shape of one of the wrench flats 43. Further, a radially inwardly extending portion 49 is provided on each die which engages the central portion 36 of the socket in order to crimp it into engagement with the hose. The right-hand end portion 50 of each die is recessed outwardly to form only minimal crimping of the flare 39 of the socket. The flare 39 is preferably pressed tightly against the cut edge of the outer cover 14, thereby preventing moisture from entering the fitting and corroding the reinforcement. The dies are mounted in a crimp machine including conventional power means, illustrated diagrammatically in FIGS. 3 and 4 by the arrows 52 for forcing the dies 46 radially inwardly with sufficient force to crimp the socket 16.

The faces of the portions 47, 49 and 50 of each die are curved or arcuate as shown in FIG. 3 and have substantially the same curve as the associated portions 41, 36 and 39 of the socket after crimping. The bottom surface of the recess 48 of each die is flat or straight as shown by the dashed lines 53 in FIG. 3, and the straight surfaces 53 form the wrench flats 43. The side surfaces 54 of each recess taper radially outwardly and inwardly (as shown in FIG. 4) from the faces of the portions 47 and 49.

To manufacture and assemble a hose and fitting assembly as described, a nipple 17 and swivel nut 18 may be shaped as shown and described by cold forming, machining or rolling processes. To assemble the parts 16, 17 and 18 with the hose 11, the socket 16 in uncrimped shape (shown in FIG. 4) is slipped over the end of the hose 11. The swivel nut 18 is slipped over the nipple 17 from the right-hand of the nipple to move the flanges 21 and 27 into engagement. The nipple 17 is then inserted into the end of the hose 11 and the socket 16 is positioned over the nipple with the portion 41 of the socket aligned with the groove 31 of the nipple. The assembly is then positioned within the opening formed between the dies which are in their retracted positions. The power means 52 is then operated to force the dies 46 radially inwardly. The portions 47 of the dies force the flare 41 to form the flange 42 in the groove 31 in order to lock the socket to the nipple. The portions 49 of the dies crimp the central portion 36 of the socket radially inwardly into tight engagement with the hose 11. The recesses 48 of the dies form the wrench flats 43 of the socket 16. The diameters of the portions 36 and 41 of the socket 16 are reduced during the crimping operation, and this reduction on both sides of the recesses causes some of the metal to be extruded lengthwise and crowded into the recesses 48 of the dies 46. The tapered sides 54 of the recesses extrude the metal against the flat bottoms 48 of the recesses, thereby forming precisely configured wrench flats. The short angular open spaces between adjacent dies leave corners 56 (FIG. 5) between adjacent flats 43, similar to those found on standard nuts. Therefore, since perfectly formed wrench flats are formed, the flats may be engaged by a standard size open end wrench, and a special wrench is not required.

The crimp dies are preferably machined to a slightly smaller diameter when closed than the finished crimp diameter of the socket to allow for "spring back" when the die pressure is released, but the diameter should not be reduced enough to cause flashing of the socket material between adjacent jaws during the crimping operation. While octagonal wrench flats are described, there could instead be hexagonal flats, in which case six dies would be provided instead of eight as shown.

What is claimed is:

1. A crimped fitting for attachment between an end portion of a hose and a fluid conduit part, said fitting comprising a tubular socket, a tubular nipple having first and second ends, said first end including an insert portion which is adapted to be inserted into said end portion of said hose, said second end extending out of said socket and including attachment means for making a sealed fluid connection with the conduit part, said nipple further comprising an intermediate portion between said first and second ends and having an annular groove formed in the outer periphery thereof, said nipple being free of wrench flats, said tubular socket being positioned concentrically around said insert and intermediate portions, said socket including a crimped first portion around said insert portion of said nipple, a crimped second portion including a flange extending into said groove of said nipple, and a crimped third portion between said first and second portions, said third portion including an outer surface having a plurality of angularly spaced crimped flat portions forming wrench flats and an inner surface in tight engagement with said intermediate portion of said nipple.

2. A crimped fitting as in claim 1, wherein said first and second portions are closely adjacent said third portion.

3. A crimped fitting as in claim 2, wherein said wrench flats have sides which taper radially outwardly and inwardly.

4. A fitting as in claim 1, wherein said attachment means includes a radially outwardly extending flange, said fitting further comprising a swivel nut rotatably mounted on said attachment means and engaging said flange.

* * * * *